United States Patent
Staub

(10) Patent No.: US 6,722,534 B2
(45) Date of Patent: Apr. 20, 2004

(54) CAST HOUSEHOLD UTENSIL

(75) Inventor: Francis Staub, Turckheim (FR)

(73) Assignee: Staub (Societe Anonyme), Turckheim (FR)

( * ) Notice: Subject to any disclaimer, the term of this patent is extended or adjusted under 35 U.S.C. 154(b) by 155 days.

(21) Appl. No.: 10/084,362

(22) Filed: Feb. 28, 2002

(65) Prior Publication Data
US 2002/0117056 A1 Aug. 29, 2002

Related U.S. Application Data
(60) Provisional application No. 60/301,859, filed on Jul. 2, 2001.

(30) Foreign Application Priority Data
Feb. 28, 2001 (FR) ............................................ 01 02746

(51) Int. Cl.⁷ ............................................. A47G 19/14
(52) U.S. Cl. ...................................... 222/466
(58) Field of Search ............................... 222/465.1, 466

(56) References Cited
U.S. PATENT DOCUMENTS 212,483 A * 2/1879 Thompson ............. 222/189.07
1,384,786 A * 7/1921 McLean ................. 222/189.07
1,709,030 A   4/1929 Manthei
3,368,721 A * 2/1968 Wiskochil .................... 222/183

FOREIGN PATENT DOCUMENTS

| EP | 05282003 | 10/1993 |
|---|---|---|
| GB | 556053 | 9/1943 |
| GB | 558911 | 1/1944 |

* cited by examiner

Primary Examiner—Philippe Derakshani
(74) Attorney, Agent, or Firm—Young & Thompson

(57) ABSTRACT

A household utensil of the receptacle type, for the reception and dispensing of liquids, in particular a teapot, is essentially constituted by a portion forming the receptacle and by a portion forming a cover, this utensil being provided moreover with a handle device. The utensil is made by gravity molding technique in a sand mold formed of two portions, namely, an external mold portion and an internal mold portion, and is present in the form of two essential portions, namely a portion forming the receptacle and comprising a pouring spout open up to the joint plane, and a portion forming a cover fitting on the receptacle portion and provided with a covering element at the level of the joint plane of the portion forming the pouring spout.

9 Claims, 2 Drawing Sheets

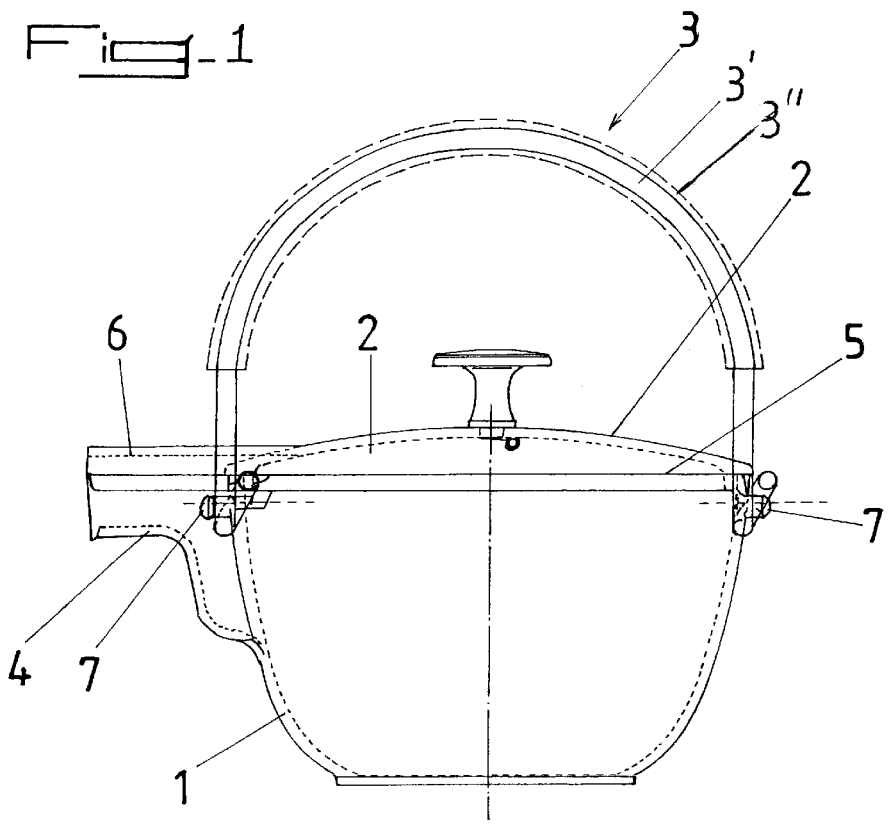
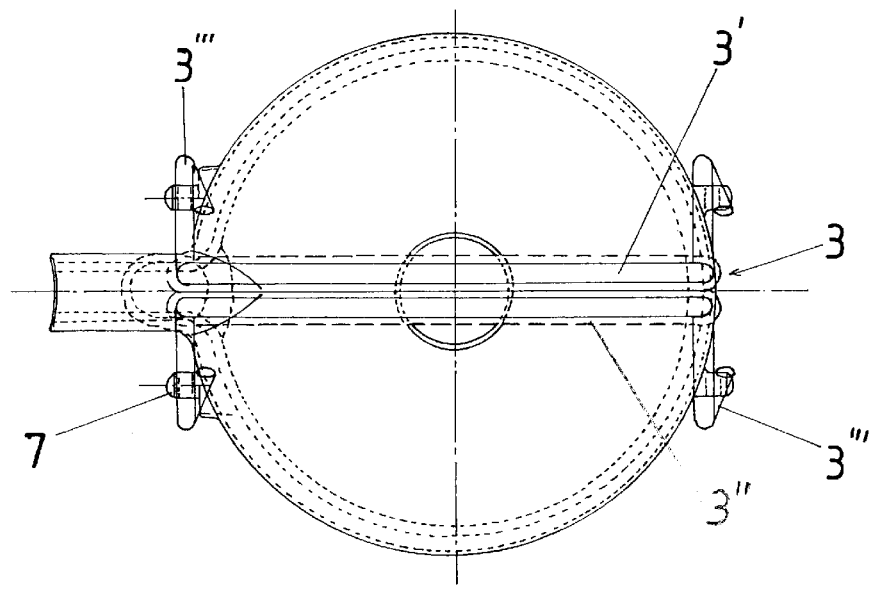

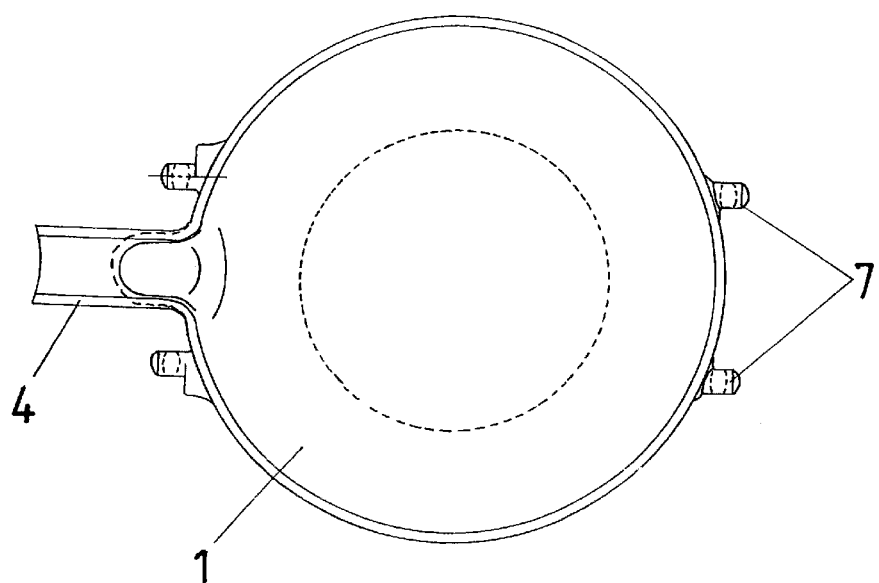
Fig_3
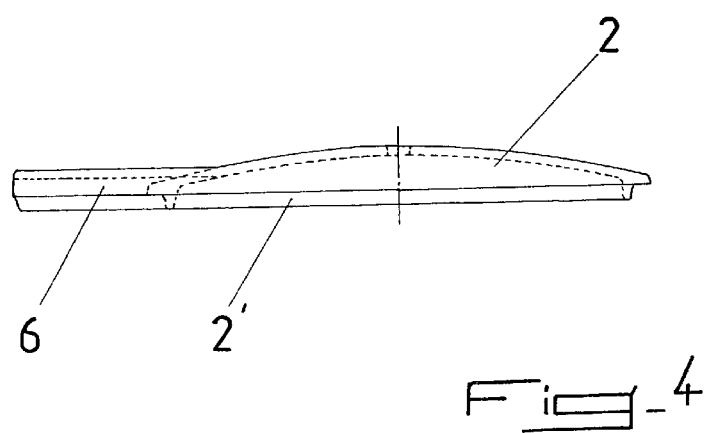
Fig_4

CAST HOUSEHOLD UTENSIL

This application claims the benefit of U.S. Provisional Application No. 60/301,859, filed Jul. 2, 2001.

The present invention relates to the field of the production of household utensils, in particular receptacles for the reception and service of hot liquids, particularly teapots, and has for its object such a cast household utensil.

Household utensils of the teapot type are generally made either of faience, terra cotta or porcelain, or of metal. In the first case, these utensils, which can be of complicated shapes, have the drawback of being relatively high in cost and above all being relatively fragile to shocks.

Thus, it has been proposed to make these utensils of metal, which has the advantage of being more resistant to shocks and thereby to avoid accidental destruction.

Teapots or the like made of metal are produced at present by a molding technique with a core, which is to say they are made to have an external appearance near that obtained by molding techniques for glazed ceramic, which is to say with production of a body having a central portion of larger size tapering toward its upper portion, with provision of a closure of the upper portion by an attached cover, a pouring spout being connected to this body, generally adjacent its lower part.

Such a molding requires, for the provision of the internal volume of the receptacle, the provision of a core integrated into the mold and destroyed after molding of the piece, so as to permit its extraction from the utensil. The channel of the pouring spout is, for its part, also produced by use of a core.

As a result, the production of such utensils by a casting technique with a core is relatively complicated and the pieces obtained are hence of a high price, which can be incompatible with merchandising corresponding to industrial production.

The present invention has for its object to overcome these drawbacks, by providing a household utensil of the receptacle type for the reception and distribution of liquids, which will be easy to make and hence of a relatively low price, whilst offering the functional and aesthetic characteristics of known utensils of this type.

To this end, the household utensil of the receptacle type for the reception and dispensing of liquids, particularly a teapot, is characterized in that it is made by a gravity casting molding technique in a sand mold formed of two parts, namely an external mold part and an internal mold part, and is present in the form of two essential parts, namely a part forming the receptacle and comprising a pouring spout open up to the joint plane and a portion forming a cover fitting on the receptacle part and provided with a covering element, at the level of the joint plane, of the part forming the pouring spout.

The invention will be better understood from the following description, which relates to a preferred embodiment, given by way of non-limiting example and explained with reference to the accompanying schematic drawings, in which:

FIG. 1 is a side elevational view of a utensil according to the invention;

FIG. 2 is a plan view corresponding to FIG. 1;

FIG. 3 is a view from above of the receptacle properly so called, and

FIG. 4 is a side elevational view of the cover portion.

FIG. 1 of the accompanying drawings shows a household utensil of the receptacle type for the reception and dispensing of liquids, in particular a teapot, which is essentially constituted by a portion 1 forming the receptacle and by a portion 2 forming a cover, this utensil being provided moreover with a handle device 3.

According to the invention, this household utensil is made by a gravity molding technique in a sand mold formed of two parts, namely an external mold part and an internal mold part, and is present in the form of two essential portions, namely a portion forming the receptacle 1 and comprising a pouring spout 4 open to the joint plane 5 and a portion forming a cover 2 fitting on the receptacle portion 1 and provided with a covering element 6, at the level of the joint plane 5, for the portion forming a pouring spout 4.

The portion 1 forming a receptacle, has a maximum cross-section at its upper edge forming the joint plane 5, for closing with the cover 2, and the pouring spout 4 forms an integral part, by casting in a single piece with this part forming the receptacle 1 and has an upper plane which coincides with the joint plane 5. The production of such a receptacle 1 can thus be obtained by a gravity molding technique using relatively simple molds, such that the cost of the pieces obtained can be considerably reduced.

The portion forming the cover 2, which is also made by gravity molding and which is provided with a covering element 6 adapted to extend above the pouring spout 4, is preferably provided with a lower lip 2' extending over all the circumference of the cover 2 and on opposite sides of the edges of the covering element 6, this lower lip penetrating, in the service position of the cover 2, into the receptacle 1 and into the corresponding edges of the pouring spout 4. Preferably, the external cross-section of the lower lip 2' on the cover 2, as well as the spacing of the external edges of said lip 2' at the level of the covering element 6 are preferably slightly greater than the internal cross-section of the receptacle 1 at the level of the joint plane 5 and the internal spacing of the corresponding edges of the pouring spout 4.

Thus, the cover 2 can be perfectly fitted onto the receptacle 1 and held there by slight pressure exerted by the lip 2' against the corresponding edge of the receptacle 1. This slight pressure ensures simultaneously a sealing between the cover 2 and the receptacle 1 sufficient for normal use of the household utensil.

According to one characteristic of the invention, the handle device 3 is preferably constituted by two identical elements 3' in the form of hand grips, which are each connected by its ends, pivotally, to corresponding attachments 7 on the external surface of the receptacle 1, made by molding in a single piece with said receptacle 1. In a known manner, these hand grips 3' can be made from a bent metallic wire provided in a central portion with sheathing 3''. The hooking ends onto the attachment 7 of the hand grips 3' are each made in the form of a twisted portion 3''', whose free end is eccentric relative to the edge of the hand grips. Thus, the twisted end 3''', during pivoting of the hand grips 3' in the direction of spacing on either side of the cover 2, for withdrawing this latter, come into contact with the edge of the receptacle 1 and block the corresponding hand grip in an open position in which said hand grip 3' does not come into contact, by the summit of its sheathed portion, with the heated region.

Moreover, as shown in FIG. 2, the hooking ends of the hand grips 3' onto the attachment 7 extend preferably at the end of a portion of said hand grip 3' forming an angle with the twisted portion of the latter. Thus, the twisted portions of the two hand grips 3' forming the handle device 3 are located, in the service position, applied against each other and their portions comprising the hooking ends bear on the cover 2, respectively at the level of the covering element 6 of the cover near the pouring spout 4 and on the side of the cover opposite said covering element 3. As a result, in the service position, the cover 2 is perfectly held onto the receptacle 1 by slight gripping arising from the bearing of the end of the hand grips 3' which form an angle with the twisted portion of these latter.

The embodiment of the receptacle and of the cover 2 by gravity molding, according to the invention, which is to say without use of a mold core, permits obtaining receptacles and covers 2 at a relatively moderate price, whilst offering the possibility of aesthetic variations of the household utensils approaching those resulting from the use of conventional techniques.

Moreover, this casting technique permits obtaining very precise dimensions such that the coaction of shape, such as those between the lip 2' and the corresponding edge of the receptable 1 at the level of the joint plane 5, as well as between the upper portion of the pouring spout 4 and the covering element 6, are possible and can ensure a certain level of sealing between the cover 2 and the receptacle 1 and the holding of said cover 2 on the receptacle 1.

Thanks to the invention, it is possible to provide on an industrial scale and at a competitive cost, household utensils usable for service having an appearance comparable to that obtained by conventional techniques. Moreover, the receptacles obtained have mechanical characteristics that are superior to those of comparable receptacles known to the present.

Of course, the invention is not limited to the embodiment described and shown in the accompanying drawings, modifications remain possible, particularly as to the construction of the various elements or by substitution of technical equivalents, without thereby departing from the scope of protection of the invention.

What is claimed is:

1. Household utensil of the receptacle type for the reception and dispensing of liquids, in particular a teapot, essentially constituted by a portion (1) forming the receptacle and by a portion (2) forming a cover, this utensil being moreover provided with a handle device (3), characterized in that it is made by gravity molding in a sand mold formed of two parts, namely an external mold part and an internal mold part, and is in the form of two essential parts, namely a part forming the receptacle (1) and comprising a pouring spout (4) open onto the joint plane (5) and a portion forming a cover (2) fitting on the portion (1) forming a receptacle and provided with a covering element (6), at the level of the joint plane (5), for the portion forming the pouring spout (4).

2. Utensil according to claim 1, characterized in that the portion forming the receptacle (1) has a maximum cross-section at its upper edge forming the joint plane (5) for its closing by the cover (2) and the pouring spout (4) forms an integral part, by molding as a single piece with said portion forming the receptacle (1) and having an upper plane which coincides with the joint plane (5).

3. Utensil according to claim 2, characterized in that the portion forming the cover (2), which is also made by gravity molding and which is provided with a covering element (6) adapted to extend above the pouring spout (4), is provided with a lower lip (2') extending over all the circumference of the cover (2) and on opposite sides of the edges of the covering element (6), this lower lip entering, in the service position of the cover (2), into the receptacle (1) and into the corresponding edges of the pouring spout (4).

4. Utensil according to claim 3, characterized in that the external cross-section of the lower lip (2') on the cover (2) as well as the spacing of the external edges of said lip (2') at the level of the covering element (6) are slightly greater than the internal cross-section of the receptacle (1) at the level of the joint plane (5) and the internal spacing of the corresponding edges of the pouring spout (4).

5. Utensil according to claim 1, characterized in that the handle device (3) is constituted by two identical elements (3') in the form of hand grips, which are each connected by its ends pivotally to corresponding attachments (7) on the external surface of the receptacle (1), made by molding in a single piece with said receptacle (1).

6. Utensil according to claim 5, characterized in that the hooking ends of the hand grips (3') on the attachments (7) are each in the form of a twisted portion (3'''), whose free end is eccentric relative to the edge of said hand grips (3').

7. Utensil according to claim 5, characterized in that the hooking ends of the hand grips (3') onto the attachments (7) extend to the end of a portion of said hand grip (3') forming an angle with the twisted portion of the latter, such that the twisted portions of the two hand grips (3') forming the handle device (3) are located, in the service position, applied one against the other and their portions comprising hooking ends bear on the cover (2).

8. Utensil according to claim 1, characterized in that the portion forming the cover (2), which is also made by gravity molding and which is provided with a covering element (6) adapted to extend above the pouring spout (4), is provided with a lower lip (2') extending over all the circumference of the cover (2) and on opposite sides of the edges of the covering element (6), this lower lip entering, in the service position of the cover (2), into the receptacle (1) and into the corresponding edges of the pouring spout (4).

9. Utensil according to claim 8, characterized in that the external cross-section of the lower lip (2') on the cover (2) as well as the spacing of the external edges of said lip (2') at the level of the covering element (6) are slightly greater than the internal cross-section of the receptacle (1) at the level of the joint plane (5) and the internal spacing of the corresponding edges of the pouring spout (4).

* * * * *